United States Patent
Sasaki et al.

(10) Patent No.: US 9,541,710 B2
(45) Date of Patent: Jan. 10, 2017

(54) OPTICAL FIBER HOLDING DEVICE

(71) Applicant: FUJIKURA LTD., Tokyo (JP)

(72) Inventors: Katsumi Sasaki, Sakura (JP); Noriyuki Kawanishi, Sakura (JP)

(73) Assignee: FUJIKURA LTD., Tokyo (JP)

( * ) Notice: Subject to any disclaimer, the term of this patent is extended or adjusted under 35 U.S.C. 154(b) by 7 days.

(21) Appl. No.: 14/609,537

(22) Filed: Jan. 30, 2015

(65) Prior Publication Data

US 2016/0223752 A1  Aug. 4, 2016

(51) Int. Cl.
*G02B 6/25* (2006.01)
*G02B 6/36* (2006.01)

(52) U.S. Cl.
CPC ................... *G02B 6/3616* (2013.01)

(58) Field of Classification Search
CPC ................... G02B 6/25; G02B 6/36
USPC .................................. 385/137, 114
See application file for complete search history.

(56) References Cited

U.S. PATENT DOCUMENTS

| | | | | |
|---|---|---|---|---|
| 5,024,363 A * | 6/1991 | Suda | .......................... | G02B 6/25 225/2 |
| 5,253,035 A * | 10/1993 | Fukuoka | ............ | G01M 11/3109 356/73.1 |
| 9,042,698 B2 * | 5/2015 | Klimowych | ............. | G02B 6/25 385/134 |
| 2008/0245836 A1 * | 10/2008 | Murgatroyd | ............. | G02B 6/25 225/2 |
| 2011/0079930 A1 * | 4/2011 | Saito | .................... | G02B 6/3846 264/1.25 |
| 2012/0288238 A1 | 11/2012 | Park et al. | | |
| 2013/0255055 A1 * | 10/2013 | Murgatroyd | ............. | G02B 6/25 29/419.1 |

FOREIGN PATENT DOCUMENTS

| | | |
|---|---|---|
| EP | 2700989 A1 | 2/2014 |
| EP | 2884318 A1 | 6/2015 |
| JP | 6-160662 A | 6/1994 |
| JP | 2000-241652 A | 9/2000 |
| JP | 2004-323274 A | 11/2004 |
| JP | 2004-347986 A | 12/2004 |
| JP | 2011183504 A | 9/2011 |
| WO | 2014157254 A1 | 10/2014 |

OTHER PUBLICATIONS

Japanese Office Action of JP 2014-228325, Dec. 19, 2014.
(Continued)

*Primary Examiner* — Kaveh C Kianni
(74) *Attorney, Agent, or Firm* — Sughrue Mion, PLLC (57) ABSTRACT

An optical fiber holding device of the invention includes a holder that includes a base and a lid which are openable and closable, sandwiches an optical fiber when the base and the lid are in a closed state, and thereby holds the optical fiber. The holder includes: an elastic body; a drive unit configured to generate driving power; and a pusher. The pusher is configured to generate a pressing force based on the driving power generated by the drive unit and press the lid by the pressing force via the elastic body. The lid and the base are configured to sandwich and hold the optical fiber based on the pressing force transmitted through the elastic body when the lid is pressed by the pusher via the elastic body.

9 Claims, 7 Drawing Sheets

(56) References Cited

OTHER PUBLICATIONS

Communication dated Feb. 17, 2015 from the Japanese Patent Office in counterpart application No. 2014-228325.
Office Action dated Aug. 11, 2015 issued by the Korean Intellectual Property Office in counterpart Korean Patent Application No. 10-2015-0025307.
Communication dated Mar. 18, 2016, from the European Patent Office in counterpart European application No. 15153609.1.
Communication dated Apr. 20, 2016 from the Korean Intellectual Property Office in corresponding Korean application No. 10-2015-0025307.

\* cited by examiner

OPTICAL FIBER HOLDING DEVICE

CROSS-REFERENCE TO RELATED APPLICATION

This application is based on and claims priority from Japanese Patent Application No. 2014-228325 filed on Nov. 10, 2014, the contents of which are incorporated herein by reference in their entirety.

BACKGROUND OF THE INVENTION

Field of the Invention

The present invention relates to an optical fiber holding device.

Description of the Related Art

Generally, in the case of cutting an optical fiber, after a coating of the optical fiber is removed and a bare optical fiber is exposed to the outside, a cutting blade is pressed onto the bare optical fiber and an initial scratch is applied thereto, and the optical fiber is cut by making the scratch larger.

At this time, the optical fiber is held and supported by an optical fiber holding device.

The above-described optical fiber holding device is provided with a pair of holders that are arranged with a predetermined distance provided therebetween. One of the paired holders holds a coated layer of the optical fiber and the other of the paired holders holds a bare optical fiber.

The aforementioned holders are constituted of for example, a base and a lid. An optical fiber mounted on the base is pressed by the lid and thereby the optical fiber is fixed.

Additionally, as the above-mentioned holder moves in the axis of the optical fiber, the optical fiber is pulled, and a tension is applied to the optical fiber.

Furthermore, as described above, a cutting blade is pressed onto the bare optical fiber that horizontally extends between the paired holders, an initial scratch is applied thereto, and the optical fiber is cut by making the scratch larger.

For example, Japanese Unexamined Patent Application, First Publication No. H06-160662 discloses the aforementioned optical fiber holding device.

As mentioned above, conventionally, when the optical fiber is held by the holder, the optical fiber is held by the base and the lid using a means for tightening a base and a lid, such as a screw, and utilizing, for example, human power or the like.

However, in the aforementioned conventional technique, in the case of fixing the base and the lid using a screw, if the base and the lid are tightly fixed, the optical fiber is destroyed. In contrast, if a degree of fixation is low, when the optical fiber is pulled, the optical fiber slips between the base and the lid, and there is a problem in that a required tension cannot be applied to the optical fiber.

In order to solve this problem, it is necessary for an operator to fix the base and the lid using a torque wrench with a high level of accuracy; however, when the optical fiber is cut, in both the paired holders, it is necessary to screw the base and the lid using the torque wrench, and it is necessary to release the coupled screw after the cutting of the optical fiber is completed, and the operability therefor is low.

SUMMARY OF THE INVENTION

The invention was conceived in view of the above-described circumstances and has an object thereof to improve operability when an optical fiber is held.

In order to achieve the aforementioned object, an optical fiber holding device according to one aspect of the invention includes: a holder including a base and a lid which are openable and closable, and the holder is configured to sandwich an optical fiber when the base and the lid are in a closed state and thereby holds the optical fiber. The holder includes: an elastic body; a drive unit configured to generate driving power; and a pusher. The pusher is configured to generate a pressing force based on the driving power generated by the drive unit and press the lid by the pressing force via the elastic body. The lid and the base are configured to sandwich and hold the optical fiber based on the pressing force transmitted through the elastic body when the lid is pressed by the pusher via the elastic body.

In the optical fiber holding device according to one aspect of the invention, the drive unit may be a motor that generates a rotating drive force as the driving power, and the pusher may include a screw member that linearly moves based on the rotating drive force and thereby generates a pressing force, and the pusher may be configured to stop the linear motion of the screw member and maintain the pressing force in the case where the drive unit is stopped and the rotating drive force is not generated.

The optical fiber holding device according to one aspect of the invention may further include: a position detection sensor that detects a position of the screw member that moves due to the linear motion of the screw member of the pusher; and a controller that controls the drive unit based on detection result obtained by the position detection sensor and thereby controls the pressing force generated by the pusher.

In the optical fiber holding device according to one aspect of the invention, the controller may store a control amount of the drive unit as control amount data where the control amount of the drive unit corresponds to the kind of optical fiber, when type information associated with the kind of optical fiber to be held by the holder is input to the controller, the controller may look up the type information in the control amount data, and the controller thereby determines a control amount of the drive unit.

The optical fiber holding device according to one aspect of the invention may further include a selection instruction output unit configured to output selection instruction to the controller as the type information where the selection instruction indicates the kind of optical fiber selected by a user, wherein the controller looks up the selection instruction in the control amount data and thereby determines the control amount of the drive unit.

The optical fiber holding device according to one aspect of the invention may further include an optical fiber detection sensor configured to detect the kind of optical fiber held by the holder and output the detection result to the controller as the type information, wherein the controller looks up the detection result in the control amount data and thereby determines a control amount of the drive unit.

The optical fiber holding device according to one aspect of the invention may further include a V-grooved base having a V-groove having a depth different depending on a diameter of the optical fiber where the V-grooved base is configured to be fitted into a groove portion provided on the base and the V-grooved base is configured to be removable from the base; and a V-grooved base detection sensor configured to detect the kind of V-grooved base fitted into the groove portion of the base and output the detection result to the controller as the type information, wherein the controller looks up the detection result in the control amount data and thereby determines a control amount of the drive unit.

The optical fiber holding device according to one aspect of the invention may further include a pair of holders, wherein the controller controls the drive unit so that, after one of the holders holds a coated layer of the optical fiber, the other of the holders holds a bare optical fiber of the optical fiber.

The optical fiber holding device according to one aspect of the invention may further include: a pressing-force transmission configured to press the lid based on the pressing force applied by the pusher via the elastic body; and a connector that allows the pressing-force transmission to be connectable to the lid and releases the connection in a state where the holder is closed, wherein when the connection is released by the connector, the lid may be openable and closable without retracting the pressing-force transmission.

The optical fiber holding device according to one aspect of the invention may further include: a rotation mechanism which rotates the holder around the optical fiber; and a movement mechanism configured to transfer the drive unit in order to release connection between the drive unit and the pusher.

Effects of the Invention

According to the optical fiber holding device according to one aspect of the invention, the optical fiber holding device includes a holder including a base and a lid which are openable and closable, and the holder is configured to sandwich an optical fiber when the base and the lid are in a closed state and thereby holds the optical fiber. The holder includes: an elastic body; a drive unit configured to generate driving power; and a pusher. The pusher is configured to generate a pressing force based on the driving power generated by the drive unit and press the lid by the pressing force via the elastic body. The lid and the base are configured to sandwich and hold the optical fiber based on the pressing force transmitted through the elastic body when the lid is pressed by the pusher via the elastic body. As a result, it is possible to automatically cause the base and the lid to be in a closed state by use of the drive unit. Additionally, since the pressing force causing the base and the lid to be in a closed state is applied to the lid via the elastic body, it is possible to protect the optical fiber and prevent damage to the optical fiber. Therefore, it is not necessary for an operator to fix the base and the lid using a torque wrench with a high level of accuracy, and it is possible to improve operability when an optical fiber is held.

DETAILED DESCRIPTION OF THE INVENTION

An optical fiber holding device A according to the embodiment is an apparatus that holds and supports the optical fiber B when an optical fiber B is cut.

Figure 1A:
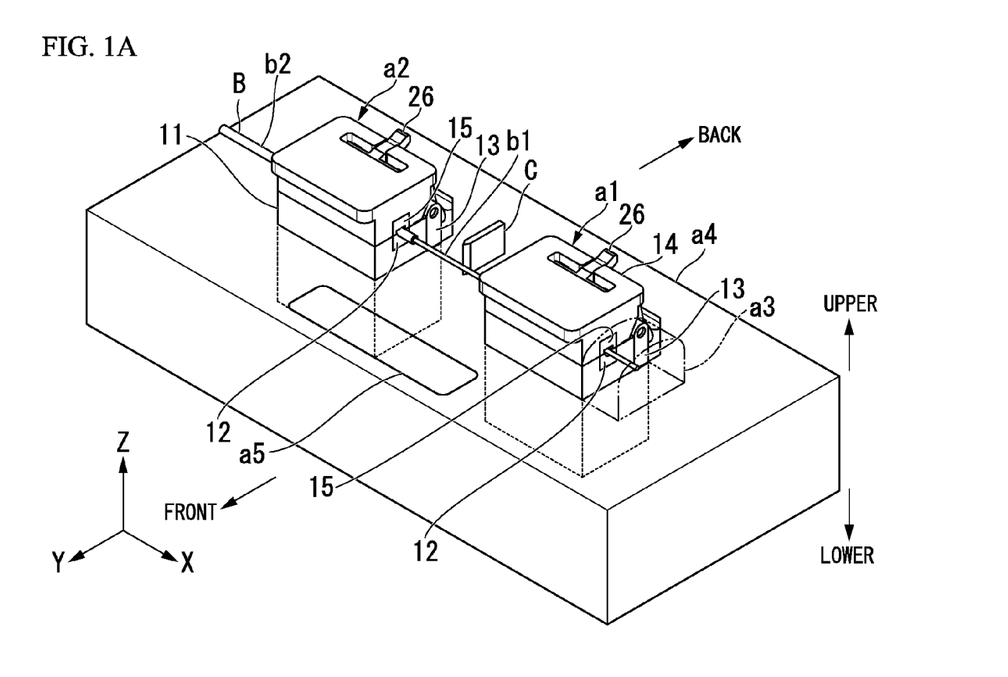
FIG. 1A is a perspective view showing a closed state of a holder of an optical fiber holding device according to one embodiment of the invention.
Figure 1B:
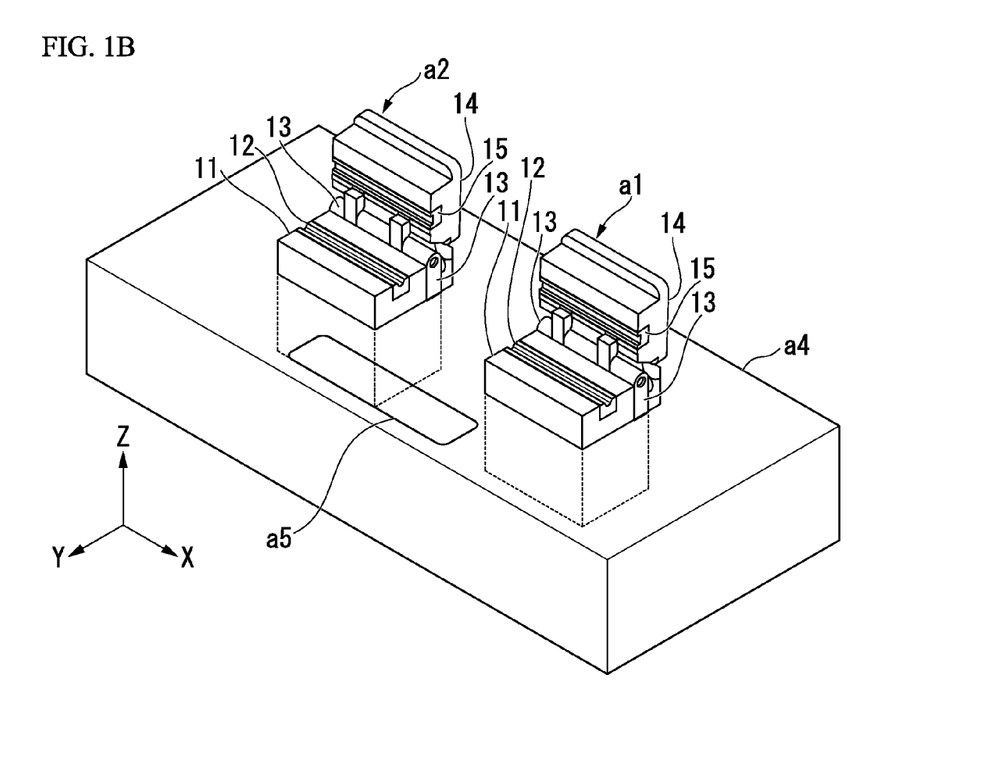
FIG. 1B is a perspective view showing an open state of the holder of the optical fiber holding device according to one embodiment of the invention.

As shown in FIGS. 1A and 1B, a cutting blade C is pressed onto the optical fiber B held by the optical fiber holding device A, and the optical fiber B is cut.

In the above-mentioned optical fiber B, a bare optical fiber b1, an inner coating layer that coats the bare optical fiber b1, and an outer coating layer b2 that coats the inner coating layer are concentrically formed (refer to FIGS. 1A and 1B).

The bare optical fiber b1 is not particularly limited, conventionally known various optical fibers, a variety of bare optical fibers, for example, a single-mode optical fiber, a multi-mode optical fiber, a polarization-maintaining optical fiber, a holey fiber, or the like may be applied.

Additionally, the outer diameter of the bare optical fiber b1 is not particularly limited. For example, the outer diameter is 125 µm.

The periphery of the bare optical fiber b1 is coated with the inner coating layer.

Furthermore, the periphery of the inner coating layer is coated with the outer coating layer b2.

The above-described inner coating layer and the outer coating layer b2 are made of, for example, ultraviolet curable resins such as a urethane acrylate based resin, an epoxy acrylate based resin, a polybutadiene acrylate based resin, a silicone acrylate based resin, a polyester acrylate based resin.

Additionally, the outer diameter of the inner coating layer is, for example, 250 μm.

On the other hand, the outer diameter of the outer coating layer b2 is, for example, 500 μm.

In the optical fiber B having the aforementioned configuration, the bare optical fiber b1 is exposed to the outside by removing the inner coating layer and the outer coating layer using a tool such as a stripper.

As shown in FIGS. 1A, 1B, 2, and 3, the optical fiber holding device A includes: a pair of holders a1 and a2, a rotation mechanism a3, a table a4, an operation unit a5, and a controller a6.

As shown in FIGS. 1A and 1B, regarding the paired holders a1 and a2, the bare optical fiber b1 of the optical fiber B is held by the holder a1 serving as one of the holders, and the outer coating layer b2 is held by the holder a2 serving as the other of the holders.

The paired holders a1 and a2 have the same structure as each other.

Therefore, hereinbelow, the configuration, action and effects of the holder a1 will be only described, the explanation of those of the holder a2 is omitted.

As shown in FIGS. 2, 4A, 4B, 5A, 5B, 6A, 6B, 7, and 8, the holder a1 includes a base 11, a V-grooved base 12, rotation shaft supports 13, a lid 14, an optical fiber presser 15, a closing motor 16, a motor gear 17, a first reduction gear 18, a second reduction gear 19, a micrometer gear 20, a micrometer 21 (screw unit), an elastic-body pusher 22, a coil spring 23, an elastic-body container 24, a pressing-force transmission 25, a connector 26, magnet 27, and a vertical movement mechanism 28.

Particularly, each of the above-described holders a1 and a2 includes a left-right movement mechanism which is not shown in the figure. The mechanism is configured to move in the axis direction of the optical fiber B, pulls the optical fiber, and thereby applies a tension to the optical fiber.

Figure 4A:
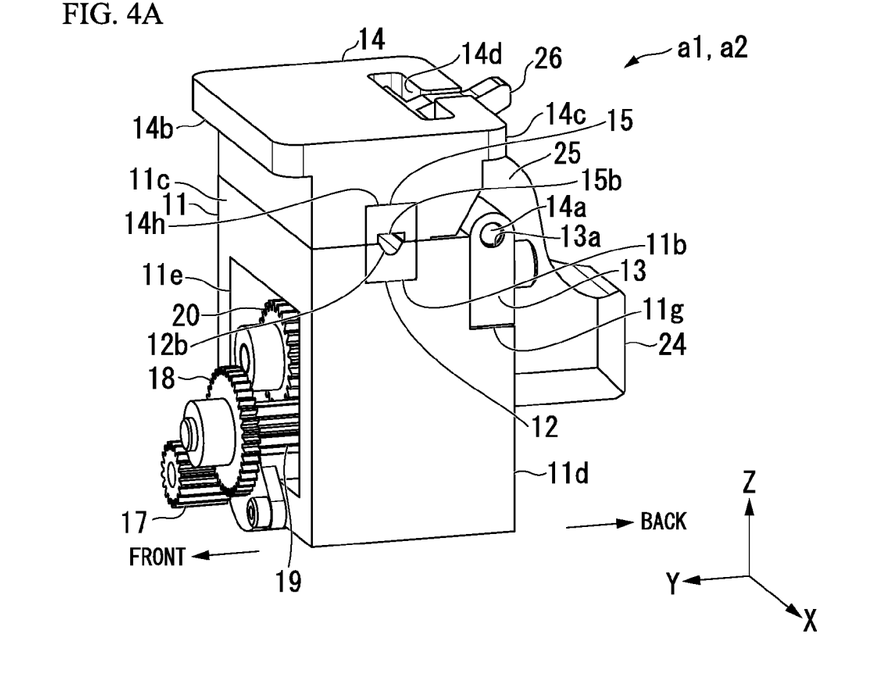
FIG. 4A is a perspective view showing the holder in a state where a lid is coupled to a pressing-force transmission by a connector according to one embodiment of the invention.
Figure 4B:
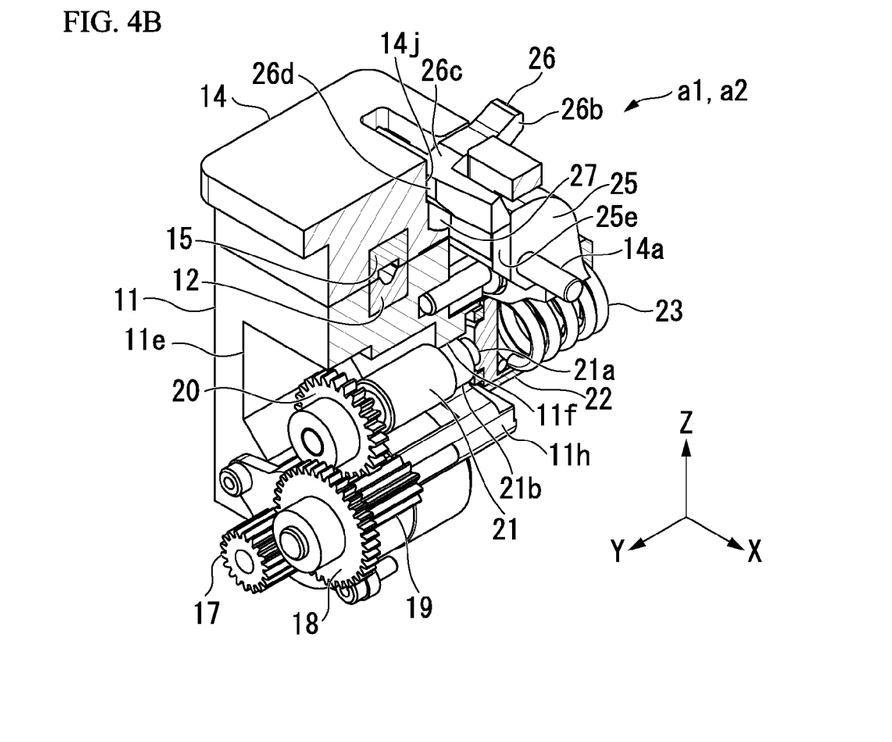
FIG. 4B is a cross-sectional view showing the holder in a state where the lid is coupled to the pressing-force transmission by the connector according to one embodiment of the invention.
Figure 5A:
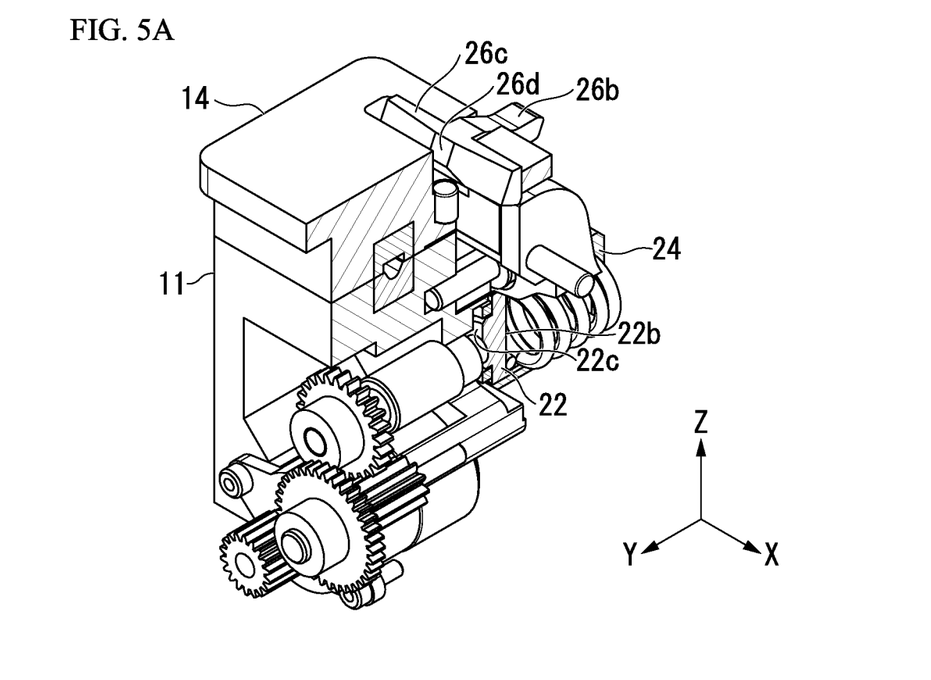
FIG. 5A is a cross-sectional view showing the holder in the case where connection between the lid and the pressing-force transmission by use of the connector according to one embodiment of the invention is released and in a state of being closed.
Figure 5B:
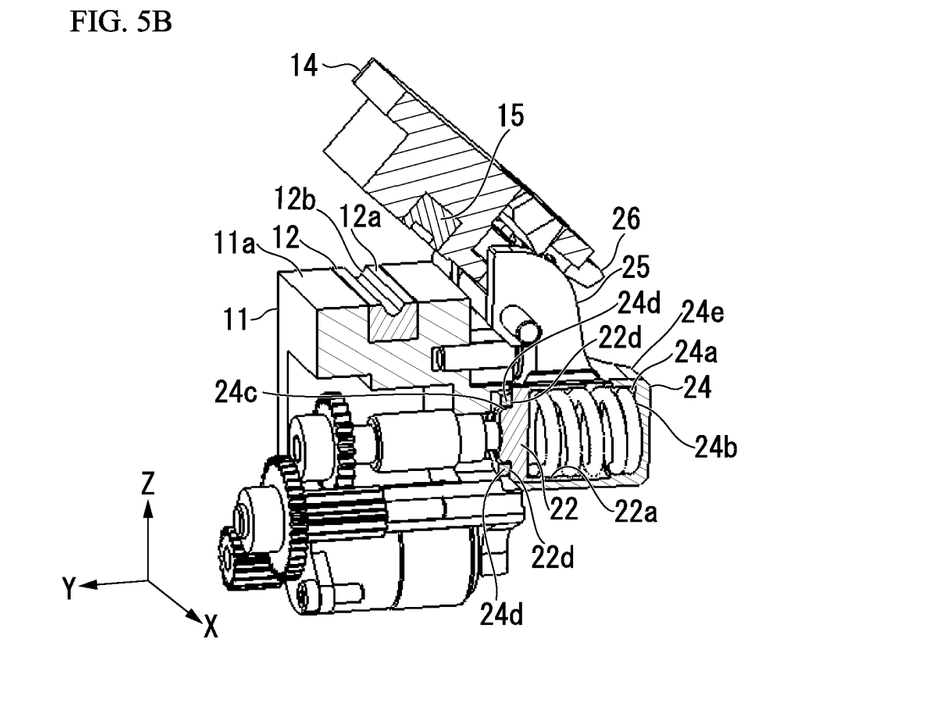
FIG. 5B is a cross-sectional view showing the holder in the case where connection between the lid and the pressing-force transmission by use of the connector according to one embodiment of the invention is released and in a state of being opened.

In explanation below, a state where the base 11 and the lid 14 overlap each other as shown in FIGS. 4A and 4B is referred to as a closed state of the holder a1.

Figure 6A:
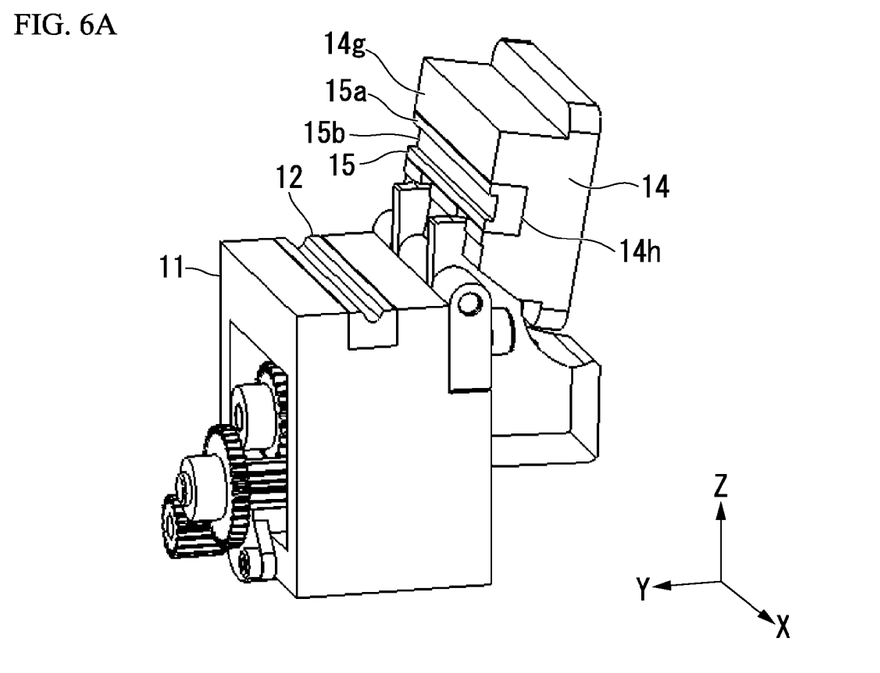
FIG. 6A is a perspective view showing the holder in the case where connection between the lid and the pressing-force transmission by use of the connector according to one embodiment of the invention is released and in a state of being opened.
Figure 6B:
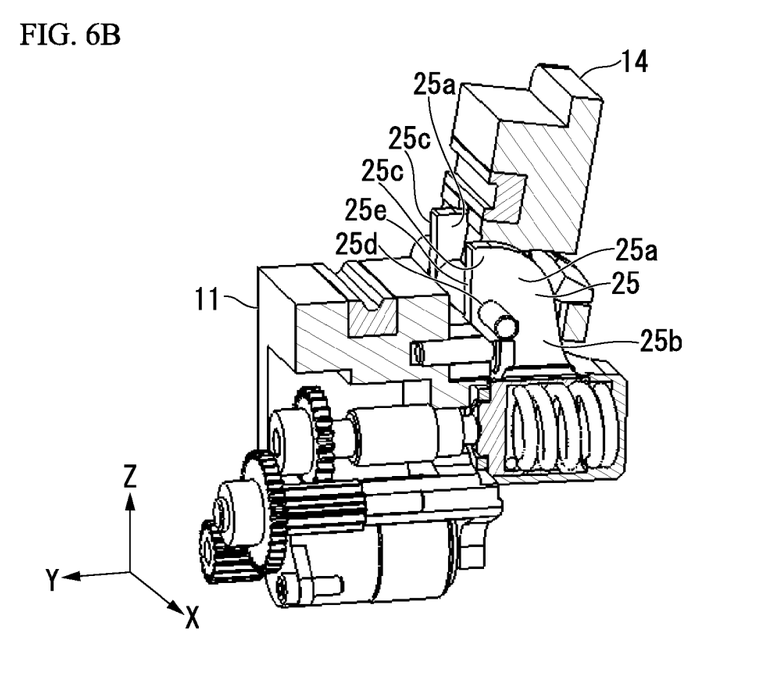
FIG. 6B is a cross-sectional view showing the holder in the case where connection between the lid and the pressing-force transmission by use of the connector according to one embodiment of the invention is released and in a state of being opened.

Additionally, a state where the base 11 and the lid 14 do not overlap each other as shown in FIGS. 6A and 6B and the top surface 11a located on the upper side of the base 11 of the optical fiber holding device A is referred to as an open state.

Moreover, the front (forward), the back (rearward), the upper, and the lower directions which will be described below are shown in FIGS. 1A and 1B.

The base 11 is made of, for example, resin materials or metal materials, and formed in a substantially rectangular shape.

A base groove portion 11b that extends in the X-direction is provided on the top surface 11a of the base 11 and at the intermediate portion in the Y-direction.

The V-grooved base 12 is fitted into the base groove portion 11b.

The V-grooved base 12 which will be described below in details is fitted into and fixed into the base groove portion 11b provided on the top surface 11a of the base 11.

Furthermore, a through hole 11e is provided in the base 11. The through hole penetrates through the centers of two side surfaces 11c and 11d which are orthogonal to the Y-direction.

The through hole 11e is formed in a stepwise shape, that is, such that the cross-sectional face thereof corresponding to the X-Z plane becomes stepwise smaller in the direction from the side surface 11c to the side surface 11d, and the through hole accommodates the micrometer gear 20 and the micrometer 21 therein.

Additionally, a fixation hole 11f is formed on the side surface 11d of the through hole 11e, a housing tube 21b of the micrometer 21 which will be described later is fitted into the fixation hole, and the micrometer 21 is fixed to and supported by the fixation hole.

Moreover, a cut-off portion 11g is provided on the base 11 so as to cut out the apex (corner) thereof formed between the top surface 11a and the side surface 11d and so that the cut-off portion is along the apex thereof.

The rotation shaft supports 13 are provided on the cut-off portion 11g. The rotation shaft support rotatably supports a first rotation shaft 14a that is provided at the lid 14.

The V-grooved base 12 is made of a material such as rubber having a static friction coefficient higher than that of, for example, the bare optical fiber b1 of the optical fiber B or a coating 92 of the outer coating layer b2 of the optical fiber.

The V-grooved base 12 is formed in a substantially rectangular shape which is fittable to the base groove portion 11b of the base 11, and the V-grooved base is fitted into the base groove portion 11b.

Furthermore, the V-grooved base 12 has a V-groove 12b formed on a top surface 12a thereof, and the V-groove extends in the X-direction.

The optical fiber B is held by the V-groove 12b when the optical fiber B is held by the optical fiber holding device A.

Therefore, the V-grooved base 12 prevents the optical fiber B from being slipped between the base 11 and the lid 14 and holds the optical fiber so that the optical fiber does not roll over in the Y-direction.

The rotation shaft supports 13 are configured to rotatably support the first rotation shaft 14a of the lid 14 and are provided at the cut-off portion 11g of the base 11.

The paired rotation shaft supports 13 are formed to provide a predetermined space therebetween, and the space is positioned at the center of the cut-off portion 11g in the X-direction thereof.

An insertion hole 13a is provided at each of the paired the rotation shaft supports 13, and the first rotation shaft 14a provided on the lid 14 is insertable to the insertion hole.

The lid 14 is made of, for example, a resin material or a metal material.

A pair of first operation piece 14b and second operation piece 14c is formed on the lid 14, and the paired first operation piece and second operation piece which protrude therefrom in the Y-direction.

That is, the first operation piece 14b protrudes forward in the Y-direction.

Additionally, the second operation piece 14c protrudes rearward in the Y-direction.

An operator catches the above-mentioned first operation piece 14b and the second operation piece 14c with their fingers and operates the lid 14. Therefore, the lid 14 rotates around the first rotation shaft 14a and can be opened and closed with respect to the base 11.

Moreover, a housing hole 14d is formed at the lid 14. The housing hole extends forward from the center of the second operation piece 14c in the X-direction thereof and is used to accommodate the connector 26 therein.

The shape of the housing hole 14d when seen in a plan view is a substantially T-shape so as to correspond to the shape of the connector 26.

Furthermore, a second rotation shaft 14e which is used to rotatably support the connector 26 is provided in the housing hole 14d.

In particular, the housing hole 14d has a space in which the connector 26 can rotate.

Moreover, in the housing hole 14d, the second rotation shaft is provided to extend in the X-direction.

Particularly, the second rotation shaft is inserted through an insertion hole 26a provided at the connector 26.

A projecting portion 14f is formed at the lid 14, and the projecting portion extends rearward and is located at the lower position which is separated from the second operation piece 14c at a predetermined distance.

The projecting portion 14f is inserted into the center portion of the space provided between the paired rotation shaft supports 13.

The first rotation shaft 14a is provided on the side surface of the projecting portion 14f which is parallel to the X-direction, and the first rotation shaft extends in the X-direction.

The first rotation shaft 14a is inserted into the corresponding insertion hole 13a of the paired rotation shaft supports 13.

The lid 14 rotates around the first rotation shaft 14a and can be opened and closed with respect to the base 11.

A lid groove 14h that extends in the X-direction is provided on the lower surface 14g of the lid 14 and at the intermediate portion in the Y-direction.

The optical fiber presser 15 is fitted into the lid groove 14h.

The optical fiber presser 15 which will be described later in details is fitted into the lid groove 14h provided on the lower surface 14g of the lid 14.

Similar to the V-grooved base 12, the optical fiber presser 15 is made of a material such as rubber having a static friction coefficient higher than that of, for example, the bare optical fiber b1 of the optical fiber B or the outer coating layer b2 of the optical fiber.

The optical fiber presser 15 is formed in a substantially rectangular shape which is fittable to the lid groove 14h of the lid 14, and the optical fiber presser is fitted into the lid groove 14h of the lid 14.

Furthermore, the optical fiber presser 15 has a recess portion 15b that is formed on a lower surface 15a and extends in the X-direction.

When the base 11 and the lid 14 are in a closed state, the lower surface 15a of the optical fiber presser 15 faces and comes into contact with the top surface 12a of the V-grooved base 12.

That is, the base groove portion 11b of the base 11 and the lid groove 14h of the lid 14 are formed and disposed so that, when the base 11 and the lid 14 are in a closed state, the V-grooved base 12 is opposed to and comes into contact with the optical fiber presser 15.

Moreover, when the base 11 and the lid 14 are in a closed state, the V-groove 12b of the V-grooved base 12 and the recess portion 15b of the optical fiber presser 15 are butt-jointed to each other and form an air space used to accommodate the optical fiber B therein.

The closing motor 16 is configured to rotationally drive the micrometer 21, and is, for example, a stepping motor.

In addition, the closing motor 16 may be a precision motor such as DC brushless motor.

The closing motor 16 is supported by the vertical movement mechanism 28 which will be described later. The closing motor moves in the vertical direction by the vertical movement mechanism 28.

Both the closing motor 16 and the vertical movement mechanism 28 are accommodated in the table a4.

The motor gear 17 is coupled to and coaxially arranged to a rotation shaft of the closing motor 16, is engaged with the first reduction gear 18, and transmits a torque obtained from the closing motor 16 to the first reduction gear 18.

Since the motor gear 17 is coupled to the closing motor 16, both the motor gear and the closing motor 16 move in the vertical direction by the vertical movement mechanism 28.

Figure 8:
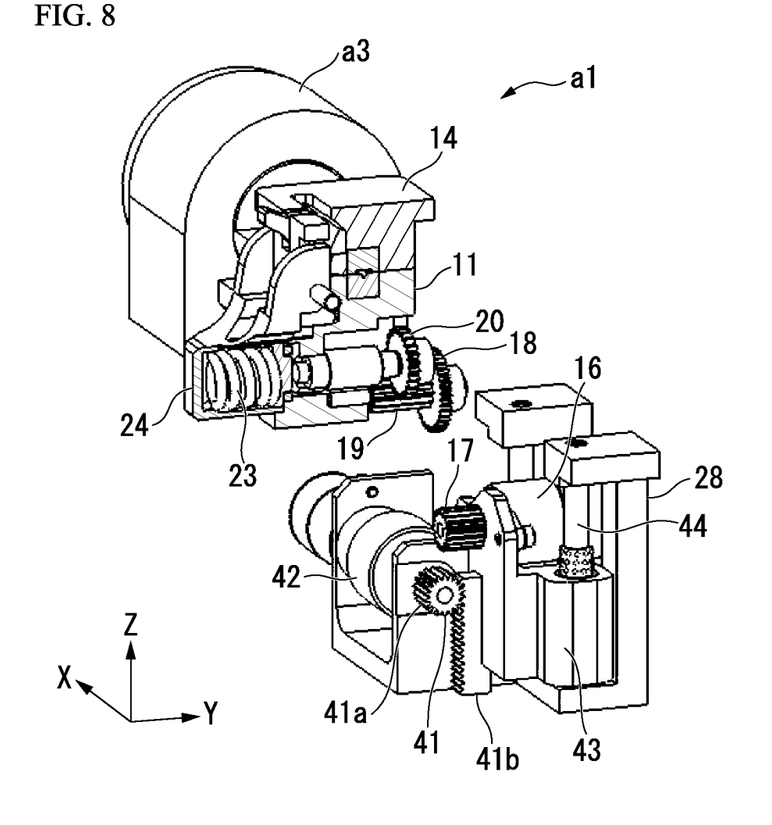
FIG. 8 is a view showing in a state where a motor of the holder according to one embodiment of the invention moves in a downward direction by a vertical movement mechanism.

In the case where the motor gear 17 moves downward by the vertical movement mechanism 28, the engagement between the motor gear 17 and the first reduction gear 18 is released.

That is, in the case where the motor gear 17 moves upward by the vertical movement mechanism 28, the motor gear 17 is engaged with the first reduction gear 18.

The first reduction gear 18 is a gear which is configured to be engaged with the motor gear 17 and which is coupled to and coaxially arranged to the second reduction gear 19.

Particularly, the first reduction gear 18 rotates by the torque transmitted from the motor gear 17, transmits the torque to the second reduction gear 19, and causes the second reduction gear 19 to rotate.

The second reduction gear 19 is a gear which is coupled to and coaxially arranged to the first reduction gear 18 and which is engaged with the micrometer gear 20.

Particularly, the second reduction gear 19 rotates by the torque transmitted from the first reduction gear 18, transmits the torque to the micrometer gear 20, and causes the micrometer gear 20.

Moreover, as described above, the first reduction gear 18 is coupled to and coaxially arranged to the second reduction gear 19, and the rotation shaft thereof is rotatably supported by an insertion hole 11h provided in the base 11.

The micrometer gear 20 is engaged with the second reduction gear 19, coupled to and coaxially arranged to the rotation shaft of the micrometer 21, and transmits the torque obtained from the second reduction gear 19 to the micrometer 21.

The micrometer 21 is configured to include a precision screw member formed by a female screw part and a rod-shaped male screw part. A female thread groove is formed on the female screw part. A male thread groove is threadably fitted into the female screw part, and the male thread groove is formed on the outer periphery of the male screw part.

The female screw part of the micrometer 21 rotates by the torque generated from the micrometer gear 20 and carries out linear motion.

The female screw part of the micrometer 21 has a contact portion 21a that is located at an end of the female screw part and is formed in a cylindrical shape. The contact portion is in contact with the elastic-body pusher 22 and applies pressure to the elastic-body pusher 22 in the Y-direction.

Furthermore, the micrometer 21 includes a tube-shaped housing tube 21b that can accommodate the contact portion 21a therein.

The housing tube 21b is fitted into the fixation hole 11f of the base 11.

The housing tube 21b of the micrometer 21 is fitted into the fixation hole 11f of the base 11 and thereby fixed to the base 11.

The elastic-body pusher 22 is entirely formed in a cylindrical shape.

A cylindrical-shaped housing space 22a is provided in the elastic-body pusher 22 and close to one of the end surfaces of the elastic-body pusher. The housing space is used to accommodate one end face of the coil spring 23.

The coil spring 23 is accommodated in the housing space 22a of the elastic-body pusher 22 so that one of the edge faces of the coil spring is in contact with a bottom surface 22b of the housing space.

Furthermore, a protruding portion 22c is formed in a projected shape at the center portion located at the other of the end surfaces of the elastic-body pusher 22. The protruding portion comes into contact with the contact portion 21a of the micrometer 21 and is pressed by the contact portion.

Additionally, a flange-shaped flange portion 22d is formed at the periphery of the protruding portion 22c of the elastic-body pusher 22.

That is, the elastic-body pusher 22 is located between the micrometer 21 and the coil spring 23.

A pressing force generated by the micrometer 21 is transmitted through the elastic-body pusher 22 to the coil spring 23.

When the pressing force due to the micrometer 21 is transmitted to the coil spring 23 through the elastic-body pusher 22, the coil spring is constricted in the Y-direction.

The coil spring 23 is formed in a cylindrical shape.

The coil spring 23 is accommodated in the housing space 22a of the elastic-body pusher 22 so that one of the edge faces of the coil spring is in contact with a bottom surface 22b of the housing space.

Furthermore, the coil spring 23 is accommodated in a cylindrical-shaped housing space 24a of the elastic-body container 24 of which will be described later so that the other of the edge faces of the coil spring is in contact with a bottom surface 24b of the housing space.

In the embodiment, the coil spring 23 is used as an elastic body. However, in other cases, the elastic body is not limited to the coil spring 23, a spring such as a plate spring other than the coil spring 23, a flexible resin such as rubber or silicone resin, or the like may be used as the elastic body.

When the pressing force due to the micrometer 21 is transmitted to the coil spring 23 through the elastic-body pusher 22, the coil spring is constricted.

The elastic-body container 24 is formed in a cylindrical shape. The cylinder-shaped housing space 24a is provided in the elastic-body container. The housing space has an opening 24c provided at one of ends thereof.

As described above, the housing space 24a accommodates the coil spring 23 therein so that the other of the end surfaces of the coil spring is in contact with the bottom surface 24b. Additionally, the housing space accommodates the elastic-body pusher 22 therein.

The protruding portion 22c of the elastic-body pusher 22 is exposed via the opening 24c.

The diameter of the housing space 24a in the cross-sectional face thereof corresponding to the X-Z plane is larger than that of the opening 24c.

Forward movement of the flange portion 22d of the elastic-body pusher 22 is limited by a limitation portion 24d that serves as a front inner wall forming the housing space 24a of the elastic-body container 24.

The pressing-force transmission 25 has a pair of transmission walls 25a which face each other in the X-direction. The pressing-force transmission is fixed to a top surface 24e of the elastic-body container 24 and is configured to press the lid 14 to be in a closed state by use of the pressing force applied from the micrometer 21 via the coil spring 23.

Each of the paired transmission walls 25a is constituted of a first protrusion portion 25b that protrudes downward in the Z-direction and a second protrusion portion 25c that protrudes forward.

An insertion hole 25d is provided on each of the paired transmission walls 25a, and the first rotation shaft 14a of the lid 14 can be inserted into the insertion hole.

The lower end of the first protrusion portion 25b is fixed to the top surface 24e of the elastic-body container 24.

The second protrusion portion 25c is inserted into the space between the paired rotation shaft supports 13 from the rear side.

The projecting portion 14f of the lid 14 inserted between the paired second protrusion portions 25c from the front side.

Each of the first rotation shafts 14a which are provided at the projecting portion 14f of the lid 14 is inserted into the corresponding insertion hole 13a of the paired rotation shaft supports 13 through the corresponding insertion hole 25d of the paired transmission walls 25a.

The paired transmission walls 25a rotate around the first rotation shaft 14a.

When the connector 26 is inserted between a front-side end face 25e of the second protrusion portion 25c and a front side face 14j of the housing hole 14d of the lid, the lid 14, the pressing-force transmission 25, and the connector 26 are fixed by frictional force generated therebetween and are connected to each other.

Figure 7:
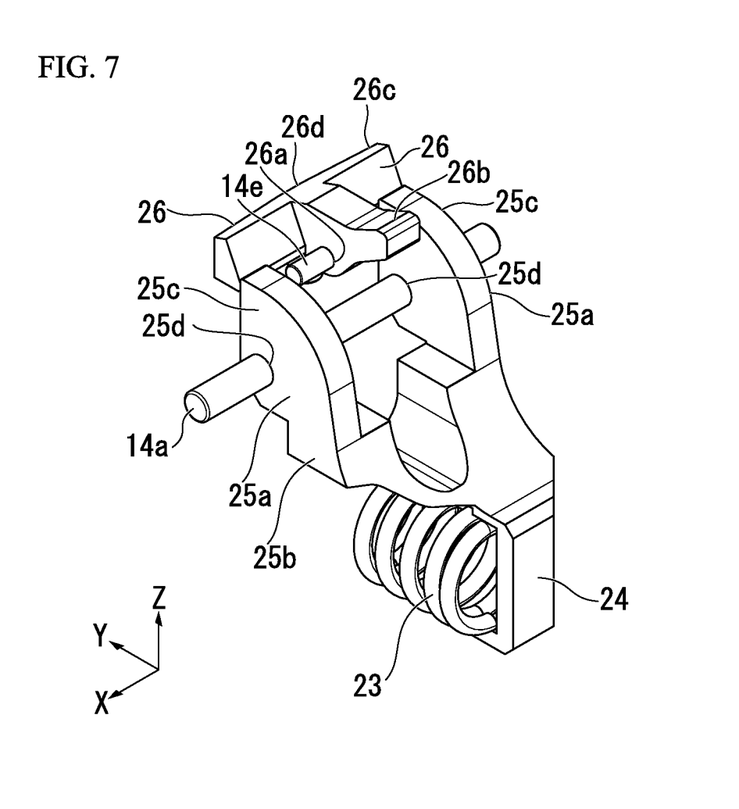
FIG. 7 is a view showing the connector and the pressing-force transmission according to one embodiment of the invention.

The connector 26 is made of a magnetic material such as iron steel and is constituted of a rod-shaped handlebar 26b extending in the Y-direction and a connection portion 26c extending in the direction orthogonal to the handlebar 26b.

The connector 26 is accommodated in the housing hole 14d of the lid 14.

Furthermore, a second rotation shaft 14e which is used to rotatably support the connector 26 is provided in the housing hole 14d.

Particularly, the second rotation shaft is inserted through the insertion hole 26a that is provided along the X-direction at the handlebar 26b of the connector 26.

A protrusion portion 26d is formed at the front side of the connection portion 26c and at the center portion in the X-direction.

When the connector 26 is inserted between the front-side end face 25e of the second protrusion portion 25c and the front side face 14j of the housing hole 14d of the lid 14, the lid 14, the pressing-force transmission 25, and the connector 26 are fixed by frictional force generated therebetween and are connected to each other.

In this case, the protrusion portion 26d comes into contact with the front side face 14j of the housing hole 14d of the lid 14.

As a result, the end of the connection portion 26c is avoided from coming into contact with only one-side of the lid 14, and the pressure applied from the connector 26 to the lid 14 can be uniform.

Furthermore, in the case where the base 11 and the lid 14 are in a closed state, when the handlebar 26b is pushed downward, the connector 26 is removed from between the front-side end face 25e of the second protrusion portion 25c and the front side face 14j of the housing hole 14d of the lid 14, and the connection therebetween is released.

The magnet 27 is a permanent magnet and is disposed at the bottom of the housing hole 14d of the lid 14 so as to face the connection portion 26c of the connector 26.

When the connector 26 is inserted between the front-side end face 25e of the second protrusion portion 25c and the front side face 14j of the housing hole 14d of the lid 14, the magnet 27 attracts the connector 26.

The vertical movement mechanism 28 is configured to move the closing motor 16 and the motor gear 17 coupled to the closing motor 16 in the vertical direction.

The vertical movement mechanism 28 is accommodated in the table a4.

Since the motor gear 17 is coupled to the closing motor 16, both the motor gear and the closing motor 16 move in the vertical direction by the vertical movement mechanism 28.

In the case where the motor gear 17 moves downward by the vertical movement mechanism 28, the engagement between the motor gear 17 and the first reduction gear 18 is released.

That is, in the case where the motor gear 17 moves upward by the vertical movement mechanism 28, the motor gear 17 is engaged with the first reduction gear 18.

The vertical movement mechanism 28 includes: a rack-pinion mechanism 41, a vertical movement motor 42, a closing-motor container 43, and a container-movement guide 44.

The rack-pinion mechanism 41 is constituted of a pinion gear 41a and a rack gear 41b.

The pinion gear 41a is coupled to and coaxially arranged to a rotation shaft of the vertical movement motor 42, is engaged with the rack gear 41b, and transmits a torque obtained from the vertical movement motor 42 to the rack gear 41b.

The rack gear 41b extends in the Z-direction and is fixed to the closing-motor container 43.

The vertical movement motor 42 is configured to generate driving power for moving up and down the closing motor 16 and the motor gear 17, and is, for example, a stepping motor.

The vertical movement motor 42 may be a precision motor such as DC brushless motor.

The closing-motor container 43 is case that houses the vertical movement motor 42, and the closing-motor container is movable upward and downward along the container-movement guide 44.

The container-movement guide 44 is configured to guide the closing-motor container 43 in the vertical direction (the Z-direction).

Figure 2:
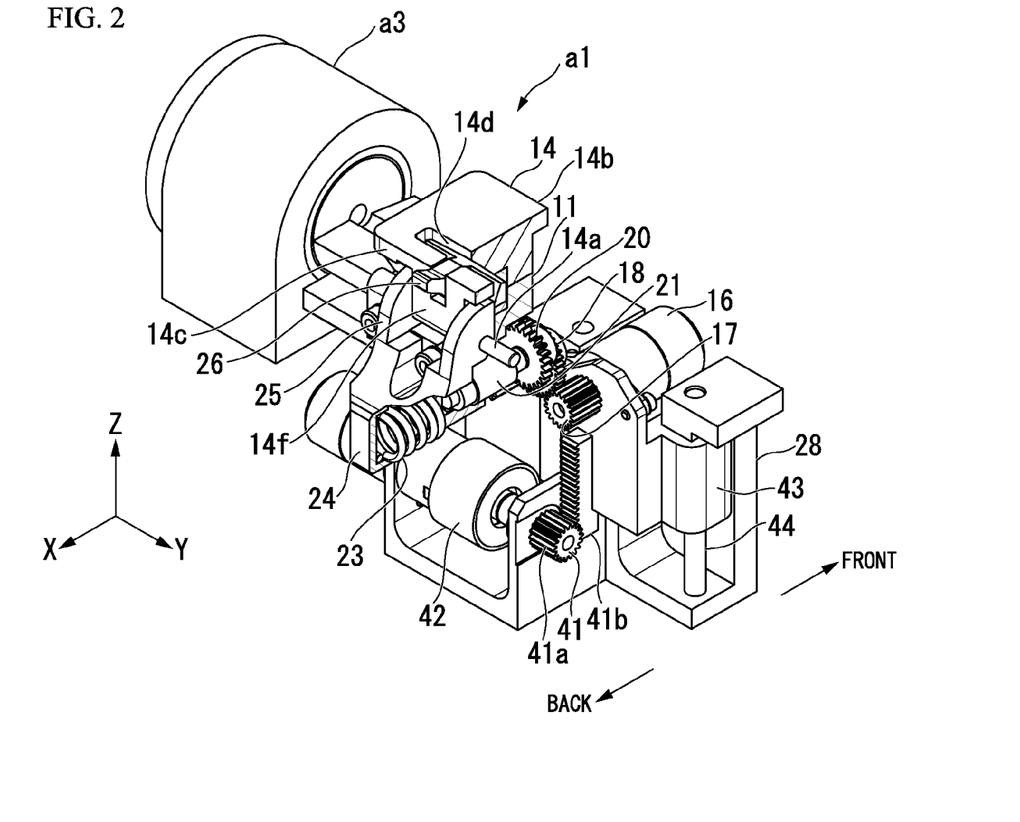
FIG. 2 is a perspective view showing the holder and a rotation mechanism according to one embodiment of the invention.

The rotation mechanism a3 is a mechanism that rotates the base 11, the V-grooved base 12, the rotation shaft supports 13, the lid 14, the optical fiber presser 15, the first reduction gear 18, the second reduction gear 19, the micrometer gear 20, the micrometer 21 (screw unit), the elastic-body pusher 22, the coil spring 23, the elastic-body container 24, the pressing-force transmission 25, and the connector 26, around the optical fiber B.

In the case of carrying out oblique cutting for forming an oblique cutting surface on the optical fiber B, as a result of rotating each of the above-mentioned units at a predetermined angle by the rotation mechanism a3, the optical fiber 13 is twisted.

In the case where, the optical fiber B is twisted, when the optical fiber B is cut in the vertical direction by the cutting blade C, it is possible to form an oblique cutting surface on the optical fiber B.

The table a4 houses part of the paired holders a1 and a2, and the controller a6. The rotation mechanism a3 and the operation unit a5 are arranged on the surface of the table.

The operation unit a5 is physically provided as a hardware button and includes, for example, a start button, a reset button, or the like.

When a user pushes each button of the aforementioned operation unit a5, an actuating signal is output from each button to the controller a6.

Figure 3:
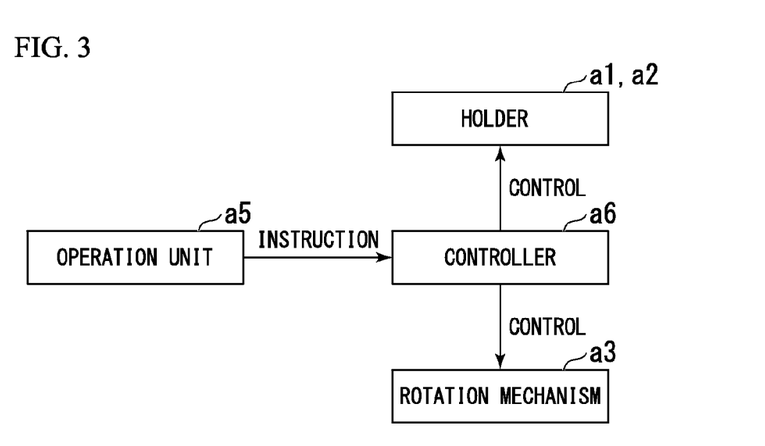
FIG. 3 is a diagram schematically showing a relation of connections of the holder, the rotation mechanism, an operation unit, and a controller according to one embodiment of the invention.

The controller a6 is constituted of a CPU (Central Processing Unit), a ROM (Read Only Memory), a RAM (Random Access Memory), units that are electrically connected to each other, an interface circuit that carries out transmitting and receiving various signals, or the like.

The controller a6 carries out various arithmetic processings based on various arithmetic control program stored in the aforementioned ROM, carries out communication with each unit, and thereby controls the entire operation of the optical fiber holding device A.

The operation of the controller a6 will be particularly described below.

Next, the operation of the optical fiber holding device A having the above-described configuration will be described in detail.

In the case of cutting the optical fiber B, the user operates the optical fiber holding device A to hold the optical fiber B.

That is, the user causes the holder a1 serving as one of the holders to hold the bare optical fiber b1 of the optical fiber 13 and causes the holder a2 serving as the other of the holders to hold the outer coating layer b2.

Here, first of all, the user sets the bare optical fiber b1 of the optical fiber B to the holder a1 serving as one of the holders. In addition to this, the user sets the outer coating layer b2 to the holder a2 serving as the other of the holders.

In this step, the optical fiber B is not completely held by the holders a1 and a2.

Subsequently, the user operates the connector 26 so as to insert the connector 26 between the front-side end face 25e of the second protrusion portion 25c and the front side face 14j of the housing hole 14d of the lid.

Consequently, the lid 14, the pressing-force transmission 25, and the connector 26 are fixed by frictional force generated therebetween and are connected to each other.

Here, in the case of carrying out oblique cutting for forming an oblique face on the cutting surface on the optical fiber B, the user moves the closing motor 16 and the motor gear 17 downward by the vertical movement mechanism 28.

At this time, the user operates, for example, the operation unit a5 and thereby moves the closing motor 16 and the motor gear 17 downward by the vertical movement mechanism 28.

That is, in the case where the operation unit a5 receives downward movement instruction, the controller a6 controls the vertical movement mechanism 28 to cause the closing motor 16 and the motor gear 17 to move downward.

As a result, the user rotates the aforementioned units at a predetermined angle by operating the rotation mechanism a3 and thereby twists the optical fiber B.

At this time, the user operates, for example, the operation unit a5 and thereby moves the closing motor 16 and the motor gear 17 downward by the vertical movement mechanism 28.

That is, in the case where the operation unit a5 receives downward movement instruction, the controller a6 controls the vertical movement mechanism 28 to cause the closing motor 16 and the motor gear 17 to move downward.

After that, the user operates the operation unit a5 and inputs selection instruction indicating the kind of optical fiber B (for example, the diameter of the optical fiber B) to the operation unit a5.

At this time, the operation unit a5 outputs the selection instruction indicating the kind of optical fiber selected by the user to the controller a6.

Subsequently, the user pushes the start button provided on the operation unit a5.

Here, the start button is a button used to start the operation of the optical fiber holding device A.

The controller a6 stores, as control amount data, a control amount of the closing motor 16 corresponding to the kind of optical fiber B.

Subsequently, when the start button of the operation unit a5 is pushed, the controller a6 looks up the selection instruction in the control amount data, determines the control amount of the closing motor 16, and thereby controls the closing motor 16 based on the determined control amount.

Consequently, the lid 14 is pressed by the micrometer 21 via the coil spring 23, and the optical fiber B is sandwiched between and held by the lid and the base 11 based on the pressing force transmitted through the coil spring 23.

Particularly, regarding the control amount of the closing motor 16, the controller a6 controls the closing motor 16 based on the detection result obtained from a rotation detection sensor provided on the closing motor 16.

Here, the controller a6 controls the closing motor 16 so that, after the optical fiber is held by the holder a2 serving as the other of the holders which is used to hold the outer coating layer b2 of the optical fiber B, the optical fiber is held by the holder a1 serving as one of the holders which is used to hold the bare optical fiber b1 of the optical fiber B.

Thereafter, the above-mentioned holders a1 and a2 move in the axis direction of the optical fiber B, pulls the optical fiber B, and thereby applies a tension to the optical fiber B (not shown in the figure).

Accordingly, the cutting blade C is pressed onto the bare optical fiber b1 that is horizontally laid between the paired holders a1 and a2, an initial scratch is applied to the bare optical fiber b1, and the bare optical fiber is cut by making the scratch larger.

In the optical fiber holding device A, the pressure of the optical fiber B, which is applied to the holders a1 and a2 in the axis direction thereof, is detected by pulling the optical fiber B and by use of a sensor (not shown in the figure) such as a load cell provided on at least one of the holders a1 and a2.

Based on the detection result obtained by the sensor such as the aforementioned load cell, the controller a6 determines whether or not the optical fiber B is cut.

Furthermore, in the case where the controller a6 determines that the optical fiber B is cut, thereafter, the controller causes the closing motor 16 to inversely rotate so that the micrometer 21 returns to an initial position.

As a result, since the pressure generated by the micrometer 21 with respect to the pressing-force transmission 25 is released, the pressing-force transmission 25 is in a state of not pressing the connection portion 26c of the connector 26.

Therefore, the holding force generated by the holders a1 and a2 with respect to the optical fiber B is only own weight of the lid 14.

In this state, even where the user catches the first operation piece 14b and the second operation piece 14c with their fingers and attempts to open the lid 14, the connection portion 26c of the connector 26 catch is caught by the front side face 14j of the housing hole 14d of the lid 14, and it is not possible to open the lid 14.

Here, the user presses downward the handlebar 26b of the connector 26, the connection portion 26c of the connector 26 is removed from between the front-side end face 25e of the second protrusion portion 25c of the pressing-force transmission 25 and the front side face 14j of the housing hole 14d of the lid 14, and the connection between the lid 14 and the pressing-force transmission 25 is released.

In this state, the lid 14 can be opened and closed without retreating the pressing-force transmission 25 rearward.

Accordingly, the user catches the first operation piece 14b and the second operation piece 14c with their fingers, opens the lid 14, and can take out the cut optical fiber B.

Moreover, in a state where the pressing-force transmission 25 is pressed by the micrometer 21, that is, in a state where the lid 14 is pressed by the micrometer 21 via the pressing-force transmission 25 and the connector 26, if the user attempts to release the connection state due to the connector 26, since the frictional force generated between the lid 14 and the connection portion 26c of the connector 26 is strong, a great force for releasing the connection state is necessary.

Furthermore, even where the connection state due to the connector 26 is released, the pressing-force transmission 25 is pushed upward due to a force (restorative force) of the coil spring 23.

According to the optical fiber holding device according to the above-described embodiment, the optical fiber holding device A includes the holders a1 and a2 including a base 11 and the lid 11 which are openable and closable, and the holders a1 and a2 are configured to sandwich an optical fiber B when the base 11 and the lid 14 are in a closed state and thereby holds the optical fiber B. The holders include: the coil spring 23; the closing motor 16 configured to generate driving power; and the micrometer 21. The micrometer 21 is configured to generate the pressing force based on the driving power generated by the closing motor 16 and press the lid 14 by the pressing force via the coil spring 23. The lid 14 and the base 11 are configured to sandwich and hold the optical fiber B based on the pressing force transmitted through the coil spring 23 when the lid 14 is pressed by the micrometer 21 via the coil spring 23. As a result, it is possible to automatically cause the base 11 and the lid 14 to be in a closed state by use of the closing motor 16. Additionally, since the pressing force used to cause the base 11 and the lid 14 to be in a closed state is applied to the lid 14 via the coil spring 23, it is possible to protect the optical fiber B and prevent damage to the optical fiber B. Therefore, it is not necessary for an operator to fix the base 11 and the lid 14 using the torque wrench with a high level of accuracy, and it is possible to improve operability when an optical fiber B is held.

Furthermore, conventionally, in the case where the optical fiber holding device A holds an optical fiber B having a different diameter, it is necessary for an operator to set and change a torque when using a torque wrench, and a setting error easily occurs.

However, according to the embodiment, the controller a6 looks up the selection instruction input from the operation unit a5 in the control amount data and thereby determines the control amount of the closing motor 16. Therefore, it is not necessary to operate a torque setting when a torque wrench is used, and it is possible to avoid occurrence of an error in the torque setting.

Conventionally, as a method for avoiding occurrence of an error in the torque setting, a method of driving a holder by a motor; however, in order to continuously maintain a required holding force, and it is required to continuously apply an electric voltage to the motor and continuously generate driving power in the motor.

As a result, in the above-described conventional case, there are problems of an increase in consumed power due to the motor, an increase in an amount of heat generation of the motor, or the like.

In contrast, according to the embodiment, the micrometer 21 includes the screw member that linearly moves based on the rotating drive force due to the closing motor 16 and thereby generates a pressing force; in the case where the closing motor 16 is stopped and a rotating drive force is not generated, the linear motion is stopped and the pressing force is maintained. Thus, it is not necessary to continuously apply a voltage to the closing motor 16, and it is possible to reduce a consumed power generated by the closing motor 16 and an amount of heat generation from the closing motor 16.

Furthermore, in the holder, the lid rotates around the rotation shaft.

Subsequently, in a process in which the lid comes into contact with the coated layer of the optical fiber and presses and crushes the coated layer, a force is generated which rotates the optical fiber, and the optical fiber slightly rotates.

Similarly, also in the case of holding the bare optical fiber of the optical fiber, a force is generated which rotates the optical fiber, and the optical fiber slightly rotates.

However, an amount of the force (rotation angle) that rotates the optical fiber while deforming, pressing, and crushing the coated layer is greater than that of the force (rotation angle) that rotates the bare optical fiber.

Particularly, in the case of carrying out fastening using a screw, pressure rapidly varies, it is difficult to fine-adjust the pressure, the amount of the force (rotation angle) that rotates the optical fiber while deforming, pressing, and crushing the coated layer is greater than that of the force (rotation angle) that rotates the bare optical fiber, and torsion of the optical fiber occurs.

If even a slight amount of the torsion of the optical fiber is present, the optical fiber cannot be precisely cut so as to have a vertical cut end face.

On the other hand, according to the embodiment, since the pressure does not rapidly vary as a result of applying the pressing force causing the base and the lid to be in a closed state to the lid 14 via the coil spring 23, a difference can be reduced which is between the amount of the force (rotation angle) that rotates the optical fiber B while deforming, pressing, and crushing the inner coating layer and the outer coating layer b2 and the amount of the force (rotation angle) that rotates the bare optical fiber b1.

However, even in the above-described case in the embodiment, the force that rotates the optical fiber B is generated. In contrast, by adopting the method described below, the optical fiber B can be held in a state of not being twisted.

First of all, the user sets the outer coating layer b2 of the optical fiber B to the holder a2 serving as the other of the holders.

Particularly, in this step, the outer coating layer b2 of the optical fiber B is not completely held by the holder a2.

Thereafter, for example, the user operates the operation unit a5, the controller a6 controls the closing motor 16 of the holder a2, and the holder a2 holds the outer coating layer b2 of the optical fiber B.

Here, a torque is generated in the optical fiber 13 and torsion occurs therein; however, the torsion of the optical fiber B is naturally solved by leaving the optical fiber for a while.

Subsequently, the user sets the bare optical fiber b1 of the optical fiber B to the holder a1 serving as one of the holders.

In this step, the bare optical fiber b1 of the optical fiber B is not completely held by the holder a1.

Thereafter, for example, the user operates the operation unit a5, the controller a6 controls the closing motor 16 of the holder a1, and the holder a1 holds the bare optical fiber b1 of the optical fiber B.

According to the above-described manner, the optical fiber holding device A can hold the optical fiber B in a state of not being twisted.

As described above, the embodiment of the invention is described, the technical scope of the invention is not limited to the above embodiment, and it is thought that, for example, modified examples described below may be adopted.

(1) In the aforementioned embodiment, the micrometer 21 is used as a pusher; however, as long as the pusher generates the pressing force based on the driving power generated by the closing motor 16 and the lid 14 is pressed by the pressing force through the coil spring 23 serving as an elastic body, the pusher is not limited to the micrometer 21.

(2) In the above-mentioned embodiment, as a result of controlling the closing motor 16 based on the detection result obtained by the rotation detection sensor, the pressing force generated by the micrometer 21 is controlled; however, the invention is not limited to this.

For example, a position detection sensor is provided which detects the position shifted by the linear motion of the screw member of the micrometer 21, and the controller a6 may be configured to control the pressing force generated by the micrometer 21 by controlling the closing motor 16 based on the detection result obtained by the position detection sensor.

For example, a position detection sensor is provided which always measures the position of the screw member, and the controller a6 may be configured to carry out feedback control so that the screw member will stop at a predetermined position.

Additionally, a position detection sensor is used which senses a position of the original point of the screw member, particularly, a photo sensor or the like is used, the original point of the screw member that moves back and forth is measured.

The controller a6 detects a stop position of the screw member as to how long does it move forward from the original point and as to how many times does it rotate.

(3) In the above-described embodiment, the user operates the operation unit a5 and inputs selection instruction indicating the kind of optical fiber B (for example, the diameter of the optical fiber B) to the operation unit a5; however, the invention is not limited to this.

For example, an optical fiber detection sensor may be provided which detects the kind of optical fiber B held by the holders a1 and a2 and outputs the obtained detection result to the controller a6.

Furthermore, a V-grooved base 12 may be provided which is provided with a V-groove having a depth different depending on a diameter of an optical fiber, and a V-grooved base detection sensor may be provided which detects the kind of V-grooved base 12 provided on the base 11 and outputs the obtained detection result to the controller a6.

In this case, the V-grooved base detection sensor scans, for example, a bar-code provided on the V-grooved base 12 and outputs the reading result to the controller a6.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. An optical fiber holding device comprising:
a holder including a base and a lid which are openable and closable, the holder being configured to sandwich an optical fiber when the base and the lid are in a closed state and thereby holds the optical fiber, the holder comprising: an elastic body; a drive unit configured to generate driving power; and a pusher, the pusher being configured to generate a pressing force based on the driving power generated by the drive unit and press the lid by the pressing force via the elastic body, the lid and the base being configured to sandwich and hold the optical fiber based on the pressing force transmitted through the elastic body when the lid is pressed by the pusher via the elastic body, the drive unit being a motor that generates a rotating drive force as the driving power, the pusher comprising a screw member that linearly moves based on the rotating drive force and thereby generates a pressing force, and the pusher being configured to stop the linear motion of the screw member and maintain the pressing force in the case where the drive unit is stopped and the rotating drive force is not generated.

2. The optical fiber holding device according to claim 1, further comprising:
a position detection sensor that detects a position of the screw member that moves due to the linear motion of the screw member of the pusher; and
a controller that controls the drive unit based on detection result obtained by the position detection sensor and thereby controls the pressing force generated by the pusher.

3. The optical fiber holding device according to claim 2, wherein
the controller stores a control amount of the drive unit as control amount data, the control amount of the drive unit corresponding to the kind of optical fiber,
when type information associated with the kind of optical fiber to be held by the holder is input to the controller, the controller looks up the type information in the control amount data, and the controller thereby determines a control amount of the drive unit.

4. The optical fiber holding device according to claim 3, further comprising:
a selection instruction output unit configured to output selection instruction to the controller as the type information, the selection instruction indicating the kind of optical fiber selected by a user, wherein
the controller looks up the selection instruction in the control amount data and thereby determines the control amount of the drive unit.

5. The optical fiber holding device according to claim 3, further comprising:
an optical fiber detection sensor configured to detect the kind of optical fiber held by the holder and output the detection result to the controller as the type information, wherein
the controller looks up the detection result in the control amount data and thereby determines a control amount of the drive unit.

6. The optical fiber holding device according to claim 3, further comprising:
a V-grooved base having a V-groove having a depth different depending on a diameter of the optical fiber, the V-grooved base being configured to be fitted into a groove portion provided on the base, the V-grooved base being configured to be removable from the base; and
a V-grooved base detection sensor configured to detect the kind of V-grooved base fitted into the groove portion of the base and output the detection result to the controller as the type information, wherein
the controller looks up the detection result in the control amount data and thereby determines a control amount of the drive unit.

7. The optical fiber holding device according to claim 2, further comprising:
a pair of holders, wherein
the controller controls the drive unit so that, after one of the holders holds a coated layer of the optical fiber, the other of the holders holds a bare optical fiber of the optical fiber.

8. The optical fiber holding device according to claim 1, further comprising:
a pressing-force transmission configured to press the lid based on the pressing force applied by the pusher via the elastic body; and
a connector that allows the pressing-force transmission to be connectable to the lid and releases the connection in a state where the holder is closed, wherein
when the connection is released by the connector, the lid is openable and closable without retracting the pressing-force transmission.

9. The optical fiber holding device according to claim 1, further comprising:
a rotation mechanism which rotates the holder around the optical fiber; and
a movement mechanism configured to transfer the drive unit in order to release connection between the drive unit and the pusher.

* * * * *